April 20, 1948.   L. T. STOYKE   2,440,027
LIFT CHECK VALVE
Filed Sept. 22, 1943   3 Sheets-Sheet 1
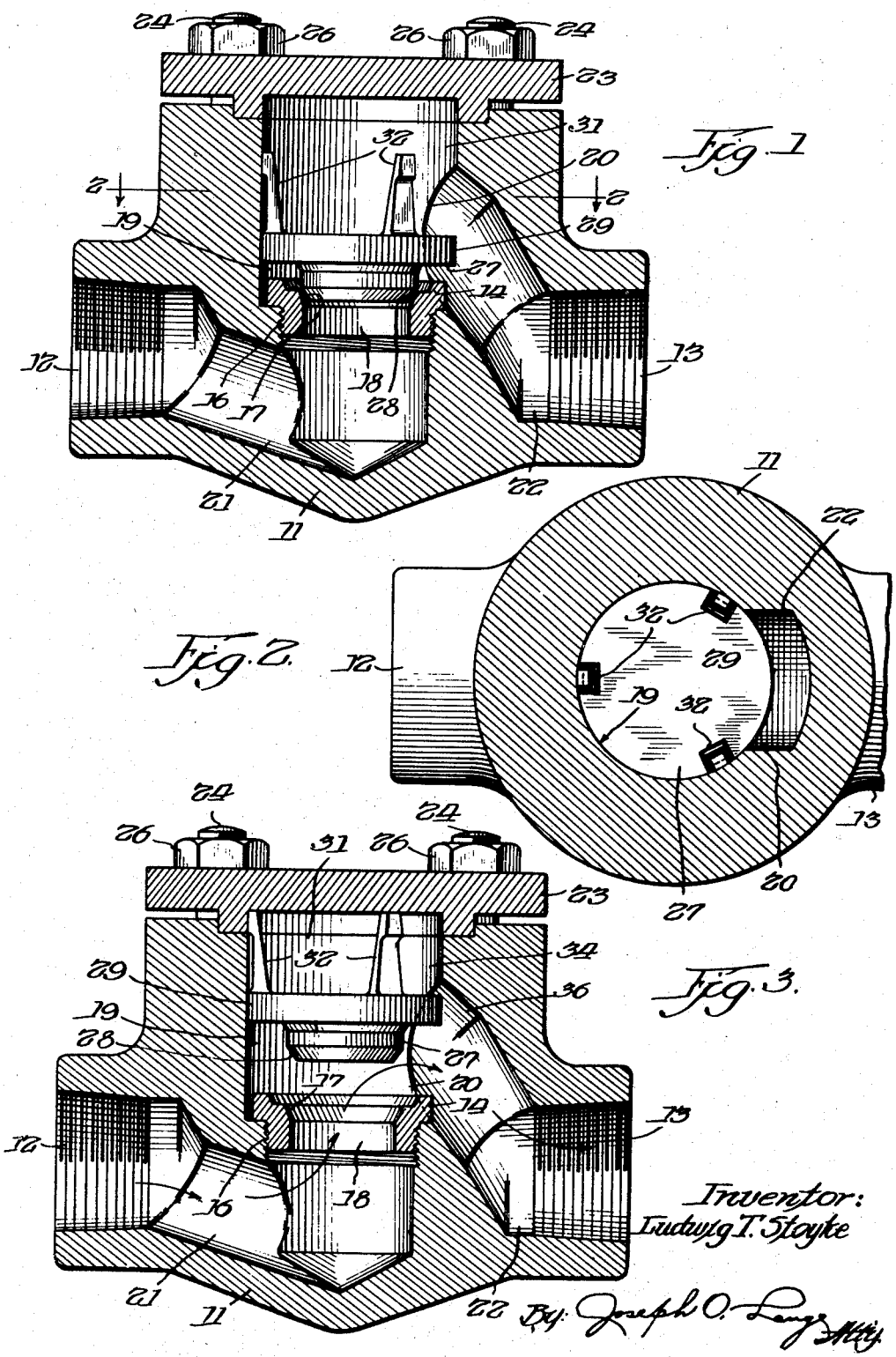

April 20, 1948.  L. T. STOYKE  2,440,027
LIFT CHECK VALVE
Filed Sept. 22, 1943  3 Sheets-Sheet 2

Inventor:
Ludwig T. Stoyke.
By Joseph O. Lange Atty.

April 20, 1948.   L. T. STOYKE   2,440,027
LIFT CHECK VALVE
Filed Sept. 22, 1943   3 Sheets-Sheet 3

Inventor:
Ludwig T. Stoyke
By Joseph O. Lange Atty.

Patented Apr. 20, 1948

2,440,027

UNITED STATES PATENT OFFICE 2,440,027

LIFT CHECK VALVE

Ludwig T. Stoyke, Chicago, Ill., assignor to Crane Co., Chicago, Ill., a corporation of Illinois Application September 22, 1943, Serial No. 503,586

5 Claims. (Cl. 251—128)

This invention relates to lift check valves and is more particularly concerned with check valves of the so-called dashpot type wherein the dashpot acts to cushion the upward movment of the disc, and has for an object the provision of a check valve which is relatively simple in construction, reliable in operation, and which will not readily get out of order.

In the operation of lift check valves embodying the instant invention, a differential in pressures acting upon opposite sides of the disc or closure member is employed to open and close the valve, and the disc must be moved to its predetermined open position to provide an unrestricted passageway through the valve. Whenever the disc fluctuates intermediate its open and closed positions, the flow is restricted and causes a pressure drop in the line. This fluctuation of the disc when near the seat also causes severe vibration, pounding and objectionable shock in the line, thereby materially reducing the useful life of the valve.

It is, therefore, an important object of this invention to provide a lift check valve of the relief dashpot type embodying means acting to initiate and maintain a pressure differential adequate for lifting and holding the disc in its predetermined open position, subject to a drop in line pressure, and thereby presenting a relatively unrestricted free flow passageway.

This invention further contemplates the provision of a lightweight disc provided with a circumferential sealing portion for relatively close sliding engagement with a disc guiding wall to limit the leakage past the disc into the dashpot chamber in order to initiate and maintain a differential in pressures serving to raise and hold the disc in open position.

This invention further contemplates improvements in check valves of the relief dashpot type wherein a guiding wall is provided either within a sleeve or integrally within the valve body itself for guiding the movement of the disc. In either form of construction a dashpot relief port is formed through the guiding wall and disposed in a direction to discharge fluid directly towards the outlet end of the valve body.

My invention embodies other novel features, details of construction and arrangement of parts which are hereinafter set forth in the specification and claims, and the accompanying drawings forming part thereof, wherein Fig. 1 is a longitudinal sectional view showing one form of lift check valve of the relief dashpot type with the disc in closed position.

Fig. 2 is a sectional view taken along the line 2—2 of Fig. 1.

Fig. 3 is a view similar to Fig. 1 but showing the disc in open position.

Figure 4:
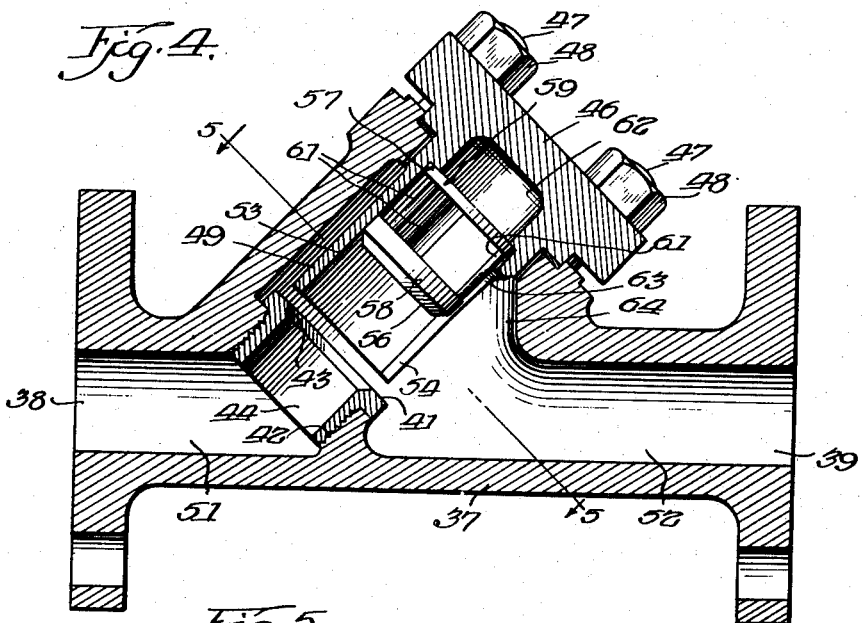
Fig. 4 is a longitudinal sectional view showing a modified form of lift check valve of the relief dashpot type with the disc in open position.

Referring now to the drawings for a better understanding of this invention, and more particularly to Figs. 1 to 3, a lift check valve of the relief dashpot type is shown comprising a body 11 having an inlet end 12 and an outlet end 13 for the conventional pipe connections (not shown). A renewable seat ring 14 is threaded into the body at 16 and is formed with a seat 17 and a port opening 18. It is obvious that, if desired, the seat ring may be made integral with the body. A disc guiding chamber 19 is formed in the body and is disposed concentric with respect to the seat 17. An inlet passageway 21 is provided in the body from the inlet end 12 to the port opening 18. An outlet passageway 22 is formed in the body from the disc guiding chamber 19 through a discharge port 20 disposed in the direction of flow for exhausting fluid from the guide chamber into the outlet passageway 22 and into the outlet end 13. A suitable cap 23 is secured on the body by means of studs 24 and nuts 26 to cover the disc guiding chamber 19.

A disc 27 is mounted for reciprocating movement within the guide chamber 19, between the seat ring 14 and cap 23, and is formed with a seat 28 for engagement with the seat 17 when the valve disc is in closed position. The disc is formed with a circumferential sealing portion 29 having a relatively close sliding fit along the wall of the guiding chamber 19 to limit the leakage past the disc and into that part of the guiding chamber above the disc known as and hereinafter referred to as the dashpot chamber 31. The disc is formed with a plurality of guide fingers 32 to hold the same in axial alignment.

In the operation of the valve thus described, fluid line pressure in the inlet passageway 21 acts to lift the disc 27 from its closed position on the seat ring 14 to its open position, illustrated in Fig. 3, to bring the ends of the fingers 32 into contact with the cap 23. The disc is maintained in open position by providing a differential in pressures on opposite sides of the disc and this is accomplished by maintaining a relatively lower pressure within the dashpot chamber 31 than is created below the disc by exhausting fluid medium from the dashpot chamber through a relief port 34 to a relatively low pressure area 36 in the outlet passageway 22. When the disc is in open position, it will be observed that an unrestricted flow passageway is provided through the valve to reduce the line pressure drop to a minimum. The disc is formed with a plurality of fingers for maintaining the disc in axial alignment in the guide chamber. The fingers also permit a free flow of the fluid medium from the dashpot chamber through the relief port 34 in the direction of flow through the valve, the relief port also serving as the sole means of communication between the seat port opening 18 and the outlet end 13 of the valve body 11. The relief port 34 is disposed in flow alignment with the discharge port 20 and leads from the dash pot chamber 31 to the low pressure area 36 within the outlet passageway 22 to provide a differential in pressure thereby serving to maintain the disc 27 in said open position.

Figure 5:
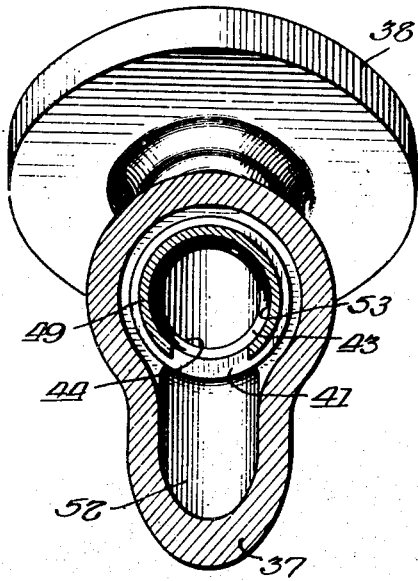
Fig. 5 is a sectional view taken along the line 5—5 of Fig. 4.
Figure 6:
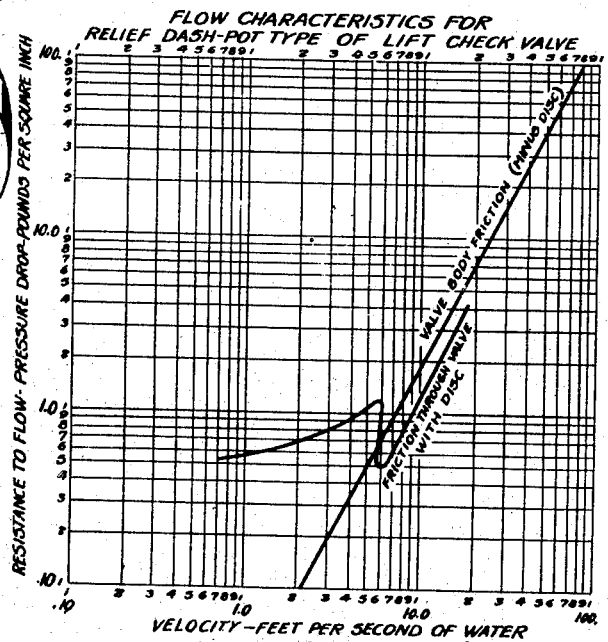
Fig. 6 is a graphic illustration showing the relative flow resistance through a lift check valve body with the disc in place and also without the disc in place.
Figure 7:
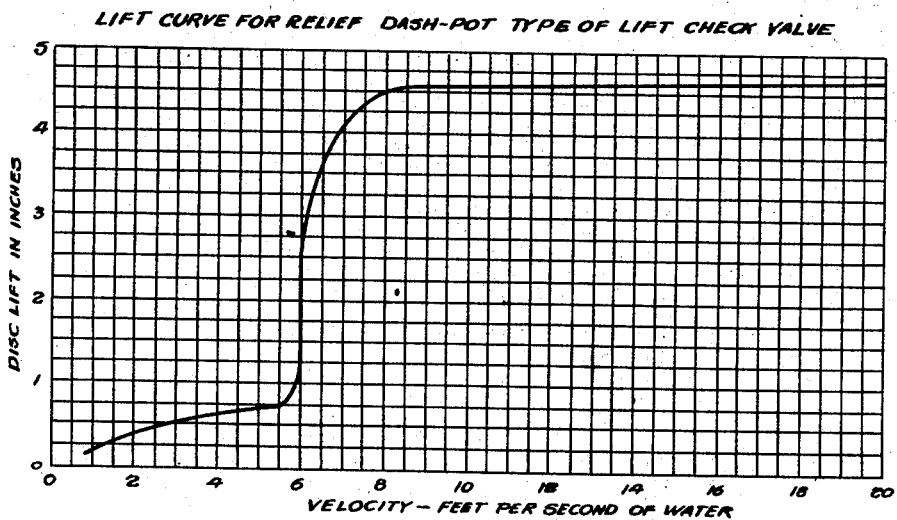
Fig. 7 is a graphic illustration showing the lift curve of the disc on one valve size with water as the fluid medium.
Figure 8:
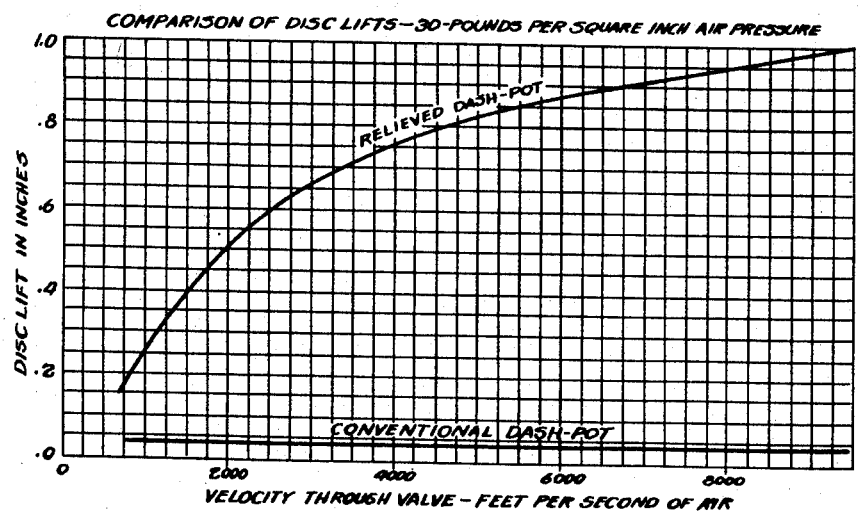
Fig. 8 is a graphic illustration showing the lift curve of the disc with air as the fluid medium.

Referring now to Figs. 4 and 5, I show a modified form of lift check valve comprising a body 37 having an inlet end 38 and an outlet end 39. A renewable seat ring 41 is threaded into the body at 42 and is formed with a seat 43 and port opening 44. A cap 46 is secured to the body by means of studs 47 and nuts 48 and is formed with a depending sleeve portion 49 disposed in axial alignment with the seat 43 and in spaced relation thereto. An inlet passageway 51 is formed in the body from the inlet end 38 to the port opening 44. An outlet passageway 52 is provided in the body from the port opening 44 to the outlet end 39.

The sleeve portion 49 is disposed in spaced relation to the wall of the passageway 52 and seat ring 41 and has a disc guide chamber 53 formed therein. A slotted opening or port 54 is formed in the sleeve 49 and disposed toward the outlet end 39 and in axial alignment therewith.

A disc 56 is mounted for reciprocating movement in the guide chamber 53 intermediate the seat 43 and the shoulder 57 and is formed with a circumferential sealing portion 58 to provide a relatively close sliding fit along the wall of the guiding chamber. An alignment ring 59 is provided on the disc and disposed in spaced relation to the sealing portion 58 by means of fingers 61. A dashpot chamber 62 is provided at the upper end of the disc guide chamber.

The operation of this modified form of check valve is similar to the form shown in Figs. 1 and 3 in that fluid line pressure under the disc serves to lift same toward its open position. The disc is then maintained in open position by providing a differential in pressures on opposite sides of the disc and this is accomplished by maintaining a relatively lower pressure within the dashpot chamber 62 than is exerted upon the underside of the disc by exhausting fluid medium from the dashpot chamber through a relief port 63 and into a relatively low pressure area 64 within the outlet passageway 52, the relief port here similarly serving as the sole means of communication between the seat port opening 44 and the outlet 39 of the valve body 37.

In the construction of each of the forms of check valves shown and described it is essential that a relatively snug sliding fit be provided between the disc and the wall of the guide chamber to prevent excessive leakage of the fluid medium past the disc and into the dashpot chamber. The object of this construction is to permit a greater volume of the fluid medium to pass from the dashpot chamber through the relief port to the low pressure area in the outlet passageway than is permitted to leak past the disc into the dashpot chamber, and thereby providing a differential in pressures on opposite sides of the disc acting to maintain same in open position. In order to obtain the best disc lifting action in valves of this design, it is desirable to provide a relatively light-weight disc of which two forms have been shown and described.

Several graphic illustrations have been provided in the drawings to illustrate the resistance to flow offered by the body with and without a disc, and disc lift curves in which both water and air were employed in the tests.

While I have shown the invention in but two forms it is obvious to those skilled in the art that it is not so limited but is susceptible of various changes and modifications without departing from the spirit thereof, such as incorporating the invention in an angle lift check valve, or other obvious change.

I claim:

1. In a check valve of the relieved dashpot type, a body having an inlet end and an outlet end, a seat provided in said body and having a port opening therethrough, the said body having means defining a disc guide chamber, a disc mounted for reciprocating movement in said disc guide chamber, means within said body defining a dashpot chamber at the upper end of the disc guide chamber, the said body having an inlet passageway for directing a fluid medium through the port opening in the seat and against the disc to raise same to the upper end of the guide chamber, the said body having a relief port for exhausting fluid from the dashpot chamber in the direction of flow through the valve to thereby provide a differential in pressures adjacent opposite sides of the disc when same is disposed in its maximum open position and serving to maintain the disc in open position, the said disc closely fitting within the said guide chamber for its entire maximum periphery except for that peripheral portion which is interrupted to provide the relief port from the dashpot chamber, means to prevent the disc from completely closing the relief port, the said relief port also serving as the sole means of communication between the seat port opening and the outlet end of the said body.

2. In a check valve of the relieved dashpot type, a body having an inlet end and an outlet end, a seat provided in said body and having a port opening therethrough, means in said body defining a disc guide chamber, a disc mounted for reciprocating movement in said guide chamber, means defining a dashpot chamber at the upper end of the disc guide chamber, means within said body defining an inlet passageway for directing a fluid medium through the port opening in the seat and against the disc to raise same to the upper end of the guide chamber, and means defining a relief port for exhausting fluid from the dashpot chamber in the direction of flow through the valve to a relatively low pressure area within said body to thereby provide a differential in pressures adjacent opposite sides of the disc when same is disposed in its maximum open position and serving thereby to maintain the disc in open position, the said disc closely fitting within the said guide chamber for its entire maximum periphery except for that peripheral portion which is interrupted so as to form the said relief port, means to prevent the disc from completely closing the relief port, the said relief port jointly serving to provide the only means of communication between the port opening in the seat and the outlet end of the valve body.

3. In a check valve of the relieved dashpot type, a body having an inlet end and an outlet end, a seat provided in said body and having a port opening therethrough, means within the body defining a disc guide chamber, a disc mounted for reciprocating movement in said guide chamber, means defining a dashpot chamber disposed at the upper end of the guide chamber, means defining an inlet passageway for directing a fluid medium through the port opening in the seat and against the disc to raise same to the upper end of the guide chamber, means defining an outlet passageway, the said body having means defining a low pressure area within said outlet passageway, and means defining a relief port disposed in the direction of flow for exhausing fluid from the dashpot chamber to the low pressure area within the outlet passageway to provide a differential in pressure serving to maintain the disc in open position, the disc fitting within the said guide chamber for its entire maximum periphery except for that peripheral portion of the guide chamber which is interrupted to form the relief port from the said chamber, means to prevent the disc from completely closing the relief port, the said relief port being in substantial axial alignment with the inner end of the said outlet passageway to serve as the only means of communication between the seat port opening and the outlet end of the said body.

4. In a check valve of the relieved dashpot type, a body having an inlet and an outlet end, a seat provided in said body and having a port opening therethrough, means defining a disc guide chamber, a disc mounted for reciprocating movement in said guide chamber, means defining a dashpot chamber disposed at the upper end of the guide chamber, means within said body defining an inlet passageway for directing a fluid medium through the port opening in the seat and against the disc to raise same to the upper end of the guide chamber, means defining an outlet passageway, the said body having means defining a low pressure area within said outlet passageway, means defining a discharge port disposed in the direction of flow for exhausting fluid from the guide chamber into the outlet passageway and directly toward the outlet end thereof, and means within the body defining a relief port disposed in flow alignment with the discharge port and leading from the dashpot chamber to the low pressure area disposed within the outlet passageway to provide a differential in pressures serving to maintain the disc in open position, means guiding said disc at a plurality of annularly arranged portions within the guide and dashpot chambers, at least one of the annularly arranged portions extending for the entire maximum periphery of the disc except for that peripheral portion of the guide chamber which is interrupted so as to form the relief port from the dashpot chamber to the outlet passageway, means to prevent the disc from completely closing the relief port, the said relief port also serving as the sole means of communication between the seat port opening and the outlet end of the valve body.

5. In a check valve of the relieved dashpot type, a body having an inlet and an outlet end, a seat provided in said body and having a port opening therethrough, means defining a disc guide chamber, a disc mounted for reciprocating movement in said guide chamber, a sealing portion formed on the disc for relatively close sliding engagement with the wall of the guiding chamber to control fluid leakage therepast, means defining a dashpot disposed at the upper end of the guide chamber, means defining an inlet passageway for directing a fluid medium through the port opening in the seat and against the disc to raise same to the upper end of the guide chamber, means within the body defining an outlet passageway, means defining a low pressure area within said outlet passageway, means defining a discharge port leading from the guide chamber into the outlet passageway and toward the outlet end thereof, further means defining a relief port disposed in flow alignment with the discharge port and exhausting from the dashpot chamber to the low pressure area within the outlet passageway to provide a differential in pressures serving to maintain the disc in open position, the said sealing portion on the disc having annular contact with the wall of the guide chamber except for that peripheral portion of the latter chamber which is interrupted to form the discharge port, the said relief port forming the sole means of communication between the seat port opening and the outlet end of the valve, the disc having upper spaced apart guide portions for limiting the miximum lift of the disc in the dashpot chamber whereby the minimum volume of flow permissible through the said relief port at the maximum lift of the disc is established.

LUDWIG T. STOYKE.

REFERENCES CITED

The following references are of record in the file of this patent:

UNITED STATES PATENTS

| Number | Name | Date |
|---|---|---|
| 103,872 | Greene | June 7, 1870 |
| 277,509 | Riegler | May 15, 1883 |
| 644,422 | Greenwood | Feb. 27, 1900 |
| 852,334 | Lewis | Apr. 30, 1907 |
| 1,147,343 | Smolensky | July 20, 1915 |
| 2,223,699 | Norgren | Dec. 3, 1940 |
| 2,289,556 | Stoyke | July 14, 1942 |

FOREIGN PATENTS

| Number | Country | Date |
|---|---|---|
| 58,256 | Germany | Aug. 11, 1891 |